(12) United States Patent
Haskell et al.

(10) Patent No.: US 7,281,200 B2
(45) Date of Patent: *Oct. 9, 2007

(54) SYSTEMS AND METHODS FOR PLAYING, BROWSING AND INTERACTING WITH MPEG-4 CODED AUDIO-VISUAL OBJECTS

(75) Inventors: Barin Geoffry Haskell, Tinton Falls, NJ (US); Atul Puri, Riverdale, NY (US); Robert Lewis Schmidt, Howell, NJ (US)

(73) Assignee: AT&T Corp., New York, NY (US)

( * ) Notice: Subject to any disclaimer, the term of this patent is extended or adjusted under 35 U.S.C. 154(b) by 451 days.

This patent is subject to a terminal disclaimer.

(21) Appl. No.: 10/662,831

(22) Filed: Sep. 15, 2003

(65) Prior Publication Data

US 2004/0054965 A1    Mar. 18, 2004

(51) Int. Cl.
*G06F 15/00* (2006.01)
(52) U.S. Cl. .................................. 715/500.1; 715/716
(58) Field of Classification Search ............. 715/500.1, 715/716, 727
See application file for complete search history.

(56) References Cited

U.S. PATENT DOCUMENTS

| | | | |
|---|---|---|---|
| 5,499,358 A | 3/1996 | Nevarez |
| 5,563,648 A | 10/1996 | Menand et al. |
| 5,574,905 A | 11/1996 | deCarmo |
| 5,586,121 A | 12/1996 | Moura et al. |
| 5,596,565 A | 1/1997 | Yonemitsu et al. |
| 5,684,804 A | 11/1997 | Baronetti et al. |
| 5,694,334 A | 12/1997 | Donahue et al. |
| 5,696,500 A | 12/1997 | Diem |
| 5,708,659 A | 1/1998 | Rostoker et al. |
| 5,732,256 A | 3/1998 | Smith |
| 5,737,595 A | 4/1998 | Cohen et al. |
| 5,737,599 A | 4/1998 | Rowe et al. |
| 5,754,242 A | 5/1998 | Ohkami |
| 5,774,664 A | 6/1998 | Hidary et al. |
| 5,794,250 A | 8/1998 | Carino, Jr. et al. |
| 5,818,845 A | 10/1998 | Moura et al. |
| 5,848,410 A | 12/1998 | Walls et al. |
| 5,852,714 A | 12/1998 | Tseng et al. |
| 5,875,303 A | 2/1999 | Huizer et al. |
| 5,886,743 A | 3/1999 | Oh et al. |

(Continued)

OTHER PUBLICATIONS

Ostermann, Animation of Synthetic Faces in MPEG-4, IEEE 1998, pp. 49-55.*

(Continued)

*Primary Examiner*—Cong-Lac Huynh

(57) ABSTRACT

A number of novel configurations for MPEG-4 playback, browsing and user interaction are disclosed. MPEG-4 playback systems are not simple extensions of MPEG-2 playback systems, but, due to object based nature of MPEG-4, present new opportunities and challenges in synchronized management of independent coded objects as well as scene composition and presentation. Therefore, these configurations allow significantly new and enhanced multimedia services and systems. In addition, MPEG-4 aims for an advanced functionality, called Adaptive Audio Visual Session (AAVS) or MPEG-J. Adaptive Audio Visual Session (AAVS) (i.e., MPEG-AAVS, MPEG-Java or MPEG-J) requires, in addition to the definition of configurations, a definition of an application programming interface (API) and its organization into Java packages. Also disclosed are concepts leading to definition of such a framework.

29 Claims, 11 Drawing Sheets

U.S. PATENT DOCUMENTS

| | | |
|---|---|---|
| 5,893,091 A | 4/1999 | Hunt et al. |
| 5,894,310 A | 4/1999 | Arsenault et al. |
| 5,905,865 A | 5/1999 | Palmer et al. |
| 5,928,330 A | 7/1999 | Goetz et al. |
| 5,940,840 A | 8/1999 | Eshel et al. |
| 5,946,487 A | 8/1999 | Dangelo |
| 5,956,729 A | 9/1999 | Goetz et al. |
| 5,961,603 A | 10/1999 | Kunkel et al. |
| 6,044,397 A | 3/2000 | Eleftheriadis et al. |
| 6,070,167 A | 5/2000 | Qian et al. |
| 6,079,566 A * | 6/2000 | Eleftheriadis et al. ...... 707/101 |
| 6,081,278 A | 6/2000 | Chen |
| 6,092,107 A * | 7/2000 | Eleftheriadis et al. ....... 709/217 |
| 6,177,928 B1 * | 1/2001 | Basso et al. ............. 715/500.1 |
| 6,185,602 B1 * | 2/2001 | Bayrakeri .................. 709/204 |
| 6,195,088 B1 * | 2/2001 | Signes ..................... 715/500.1 |
| 6,269,394 B1 | 7/2001 | Kenner et al. |
| 6,320,623 B1 | 11/2001 | Cavallerano et al. |
| 6,385,242 B1 * | 5/2002 | Chen .................... 375/240.03 |
| 6,452,598 B1 | 9/2002 | Rafey et al. |
| 6,564,263 B1 * | 5/2003 | Bergman et al. ............ 709/231 |
| 6,631,403 B1 * | 10/2003 | Deutsch et al. ............ 709/217 |
| 6,654,931 B1 * | 11/2003 | Haskell et al. ........... 715/500.1 |
| 6,751,623 B1 * | 6/2004 | Basso et al. ................ 707/101 |
| 6,801,575 B1 * | 10/2004 | Crinon .................. 375/240.26 |
| 6,895,555 B1 * | 5/2005 | Ando .......................... 715/719 |
| 6,934,906 B1 * | 8/2005 | Cheok ..................... 715/500.1 |
| 6,976,208 B1 * | 12/2005 | Kim et al. ............... 715/500.1 |
| 2001/0000962 A1 * | 5/2001 | Rajan ......................... 345/302 |
| 2002/0133546 A1 * | 9/2002 | Liang et al. ................ 709/204 |
| 2002/0140721 A1 * | 10/2002 | Vasudevan et al. ......... 345/723 |
| 2003/0037156 A1 * | 2/2003 | Mallart ....................... 709/231 |
| 2003/0212995 A1 * | 11/2003 | Kitamori ..................... 725/41 |
| 2006/0064716 A1 * | 3/2006 | Sull et al. ..................... 725/37 |
| 2006/0143560 A1 * | 6/2006 | Gupta et al. ................ 715/512 |

OTHER PUBLICATIONS

Eleftheriadis, MPEG-4 Systems: Architecting Object-Based Audio-Visual Content, IEEE Dec. 1998, pp. 535-540.*

Battista et al., MPEG-4 : A Multimedia Standard for the Third Millennium, Part 1, IEEE 1999, pp. 74-83.*

Pereira et al., MPEG-4—Opening New Frontiers to Broadcast Services, Google 1999, pp. 1-14.*

Eleftheriadis, Flavor: A Language for Media Representation, ACM 1997, pp. 1-9.*

Bober et al., Video Coding for Mobile Communications—MPEG4 Perspective, Google 1996, pp. 1-9.*

Chiariglione, MPEG : A Technological Basis for Multimedia Applications, IEEE1995, pp. 85-89.*

Battista et al., MPEG-4: A Multimedia Standard for the Third Millennium, Part 1, IEEE 1999, pp. 74-83.*

Battista et al., MPEG-4: A Multimedia Standard for the Third Millennium, Part 2, IEEE 2000, pp. 76-84.*

Casalino et al., MPEG-4 Multicast over Satellite, IEEE 1999, pp. 989-990.*

Sheirer et al., AudioBIFS: Describing Audio Scenes with the MPEG-4 Multimedia Standard, IEEE 1999, pp. 237-250.*

Purnhagen, An Overview of MPEG-4 Audio Version 2, AES 17the International Conference on High Quallity Audio Coding, Sep. 1999, pp. 1-12.*

AES Special Publications Conference Proceedings and Collected Papers for showing the date of Pumhagen's article Sep. 1999.*

L. Chiariglione, "MPEG and Multimedia Communications", *IEEE Transactions on Circuits and Systems for Video Technology*, vol. 7, No. 1, Feb. 1997, pp. 5-18.

Y. Fang et al., "Adding Bitstream Input/Output Library in Java", *International Organization for Standardization*, ISO/IEC JTCI/SC29/WG11 MPEG97/M2063, Apr. 1, 1997, pp. 1-6.

A. Puri et al., "APIs for MPEG-4 Systems", *International Organization for Standardization*, ISO/IEC ITCI/SC29/WG11 MPEG97/2133, Apr. 1997.

J. Heid, "Watch This: Streaming Video on Your Web Site", *MACWORLD*, Apr. 1998, pp. 109-112.

A. Griffin, "Video on the Net", *Popular Mechanics*, Mar. 1998, pp. 51-53.

A. Basso et al., "MPEG-4 Integrated intermedia Format (IIF): Basic Specification", *International Organization for Standardization*, ISO/IEC JTCI/SC29/WG11 MPEG98/M2978, Jan. 16, 1998, pp. 1-22.

J. Laier et al., "Content-Based Multimedia Data Access in Internet Video Communication", *First International Workshop on Wireless Image/Video Communications*, Sep. 1996, pp. 126-133.

A. Eleftheriadis et al., "Stored File Format for Object-based Audio Visual Representation", pp. 1-8.

* cited by examiner

SYSTEMS AND METHODS FOR PLAYING, BROWSING AND INTERACTING WITH MPEG-4 CODED AUDIO-VISUAL OBJECTS

This application claims the benefit of U.S. patent application Ser. No. 09/236,462, filed Jan. 25, 1999, which claims the benefit of U.S. Provisional Application No. 60/072,923 filed on Jan. 28, 1998. The contents of these applications are incorporated herein by reference.

BACKGROUND OF THE INVENTION

1. Field of Invention

This invention relates to systems and methods for decoding and presenting encoded audio and visual data. More specifically, this invention relates to systems and methods for playing, browsing and interacting with MPEG-4 coded scenes including one or more audio and/or visual objects.

2. Description of Related Art

MPEG-1 and MPEG-2 encoding and decoding standards are frame-based encoding and decoding techniques. That is, in MPEG-1 and MPEG-2, audio-visual data, such as a video recording, is organized into separate frames, where each frame is a complete image. In MPEG-1 and MPEG-2, the human-recognizable objects within each image are not distinguished from each other in encoding and decoding the data defining the image. Thus, while each frame can be treated independently from any other frame, each frame is itself a unitary element of the audio-visual data. FIG. 1 is an exemplary embodiment of an MPEG-2 playback system.

The Virtual Reality Modeling Language, or VRML, is a computer language that is used to create text descriptions defining three-dimensional synthetic images. That is, VRML is used to define the three-dimensional objects that appear in a synthetic, e.g., computer-generated, image, including shapes and sizes of the objects, the appearance of each object, including, material, color, shading and texture, and the location of each objects, including position and orientation. The objects are generally synthetic, e.g., computer-generated, objects. VRML is also used to define the lighting in the synthetic image, including the type and position of one or more light sources.

SUMMARY OF THE INVENTION

MPEG-4 is a new audio-visual data encoding and decoding standard. In particular, MPEG-4, in contrast to MPEG-1 and MPEG-2, is not a frame-based encoding and decoding technique. MPEG-4 is an object-based encoding and decoding technique. Objects can be synthetic or natural objects, and further, can be audio, video or graphics objects. In MPEG-4, each frame is decomposed into a plurality of different objects and a scene description graph that indicates where each object appears in that frame. The object-based nature of MPEG-4, along with requirements of flexible composition and user interactivity, requires using some scene description mechanism.

Each object resides in its own video object plane that defines at least that object's shape, motion, opaqueness and color, including surface texture. The scene description graph defines the spatial location of each object within the bounds of the frame. The scene description graph also defines the position of each object within the depth of the frame, i.e., which objects are "in front of" which other objects.

These features allow new kinds of flexibilities not offered by simply decoding and presenting a video frame as in MPEG-2. MPEG-4 players can be flexible, and the systems and methods for playing, browsing and interacting with MPEG-4 coded scenes of this invention allows users the ability to browse two-dimensional (2D) or three-dimensional (3D) MPEG-4 scenes typically composed from synthetic and natural media elements. Furthermore, the systems and methods for playing, browsing and interacting with MPEG-4 coded scenes of this invention allow users the ability to interact with and customize such scenes. This invention further describes systems and methods for constructing MPEG-4-based multimedia players and browsers to facilitate these flexibilities, such as programmatic control via JavaScript and Java, and to enhance the user's experience, while, at the same time, remaining compatible with the MPEG-4 standards.

These and other features and advantages of this invention are described in or are apparent from the following detailed description of the systems and methods according to this invention.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

The following detailed description sets forth exemplary embodiments of a number of novel configurations of a system for playing back, browsing and allowing user interaction with MPEG-4 encoded objects. As indicated above, the MPEG-4 playback, browsing and user interaction systems of this invention are not simple extensions of MPEG-2 playback systems. Rather, due to the object-based nature of MPEG-4 encoding, decoding and presenting audio-visual data encoded using MPEG-4 presents novel opportunities and challenges in synchronized management of the independently-encoded objects that form a scene. The novel configurations of the system for playing back, browsing and allowing user interaction with MPEG-4 encoded objects of this invention allow significantly new and enhanced multimedia services and systems.

In addition, MPEG-4 also allows for an advanced functionality called adaptive audio visual session (AAVS), which requires, in addition to definitions of configurations, definitions of Application Programming Interfaces (APIs) and their organization into Java packages. It should be appreciated that the term "AAVS" has been changed to MPEG-AAVS, MPEG-Java or MPEG-J (hereafter referred to as "MPEG-J") in later versions of the MPEG-4 standard. The novel configurations of the system for playing back, browsing and allowing user interaction with MPEG-4 encoded objects of this invention provide a definition of such a framework. Finally, the novel configurations of the system for playing back, browsing and allowing user interaction with MPEG-4 encoded objects of this invention provide for development tools and environments for AAVS (i.e., MPEG-J) work.

Figure 1:
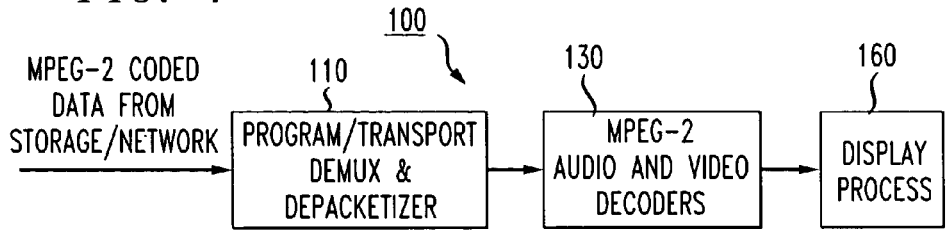
FIG. 1 is an exemplary embodiment of an MPEG-2 playback system.

It may appear that a MPEG-4 playback system can be derived simply as an extension of known MPEG-2 playback systems, such as that shown in FIG. 1. However, the MPEG-4 standard, due to its object-based structure, is very different from the MPEG-2 standard. Thus, the MPEG-4 standard presents new paradigms for synchronizing individual audio-visual objects and for their composition. In turn, the MPEG-4 standard also offers new opportunities in the sense of flexibilities such as browsing and user interaction with MPEG-4-coded scenes. The following detailed description of this invention outlines a number of MPEG-4 audio-visual object browser systems of this invention that allow for various degrees of flexibilities for MPEG-4 playback, browsing and scene control and interaction.

As indicated above, FIG. 1 shows a basic MPEG-2 playback system 100. The primary components of this basic MPEG-2 playback system 100 include a program/transport demultiplexer and depacketizer 110, one or more MPEG-2 audio/video decoders 130, and a display process 160. The MPEG-2-coded data received from a storage device or from a node of a distributed network is fed to the program/transport demultiplexer and depacketizer 110. Appropriate pieces of the demultiplexed and depacketized MPEG-2-coded data are fed to the respective ones of the one or more MPEG-2 audio/video decoders 130. The decoded data output by the one or more MPEG-2 audio/video decoders 130 is sent to the display process 160.

U.S. patent application Ser. No. 09/055,929, filed Apr. 7, 1998, incorporated herein by reference, discloses various embodiments of a basic MPEG-4 encoder and a basic MPEG-4 decoder. However, the MPEG-4 decoder disclosed in the 929 application does not permit any user interaction with the MPEG-4-coded data received by that MPEG-4 decoder. U.S. patent application Ser. No. 09/055,934, filed Apr. 7, 1998, incorporated herein by reference, discloses various embodiments of various application programming interfaces (APIs) that provide decoding, functionality and authoring capabilities to an MPEG-4 audio-visual object playback system, such as the MPEG-4 audio-visual object playback systems according to this invention.

Figure 2:
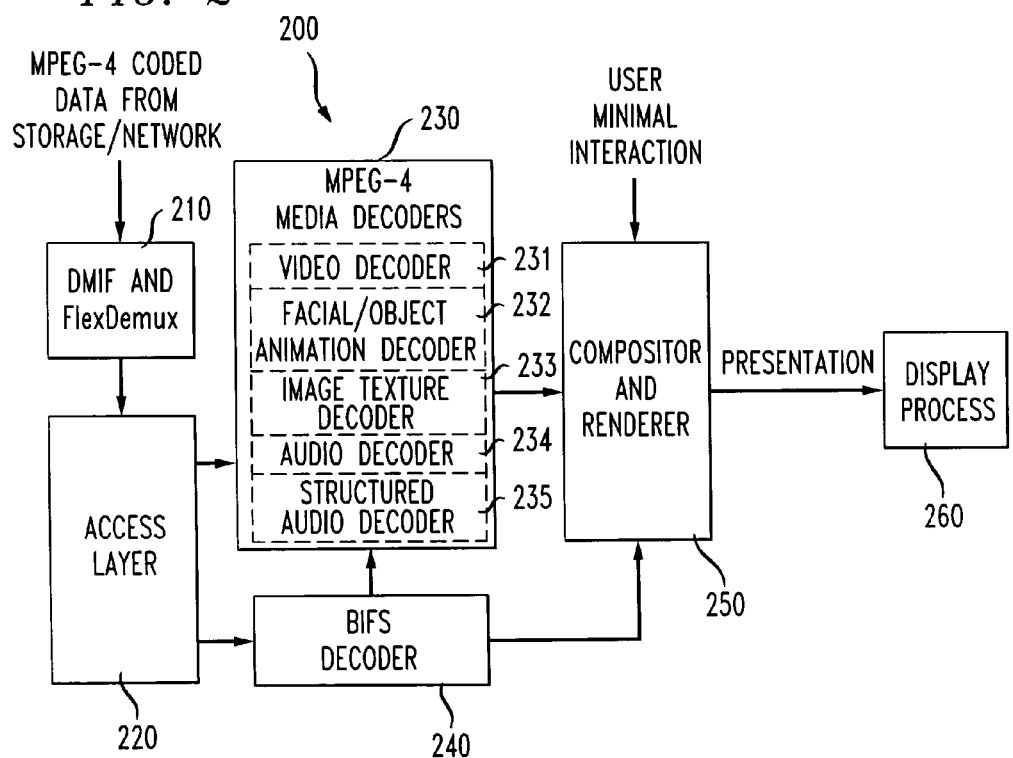
FIG. 2 is a functional block diagram of an exemplary embodiment of an MPEG-4 audio-visual objects playback system.

FIG. 2 is a functional block diagram of an exemplary embodiment of an MPEG-4 audio-visual object playback system 200. As shown in FIG. 2, the MPEG-4 audio-visual objects playback system 200 includes a delivery media integration framework and flexible demultiplexing layer (DMIF and FlexDemux) 210, an access layer 220, a MPEG-4 media decoder 230, a binary format of scene (BIFS) decoder 240, a compositor and renderer 250 and a display process 260. The MPEG-4 media decoder 230 includes a plurality of individual decodes, including, but not limited to, one or more of a video decoder 231, a facial/object animation decoder 232, an image texture decoder 233, an audio decoder 234, and a structured audio decoder 235.

It should be appreciated that the MPEG-4 media decoder 230 can include any known or later-developed decoder. It should also be appreciated that the BIFS decoder 240 is based on VRML, but extends VRML beyond the static three-dimensional objects normally supported by VRML. The BIFS decoder 240 thus allows for two-dimensional scenes, video objects and audio objects that are normally not supported by conventional VRML. The incorporated 934 application describes various decoders that can be incorporated into either of the MPEG-4 media decoder 230 and/or the BIFS decoder 240.

As shown in FIG. 2, the MPEG-4-coded data received from a storage device or from a node of a distributed network is fed to the delivery media integration framework and flexible demultiplexing layer (DMIF and FlexDemux) 210. The delivery media integration framework and flexible demultiplexing layer (DMIF and FlexDemux) 210 outputs one or more flexmux protocol data units (FlexMux-PDUs). The FlexMux PDUs are input by the access layer 220, which outputs unformatted access layer protocol data units (AL-PDUs). The unformatted access layer protocol data units (AL-PDUs) are input by the MPEG-4 media decoder 230. In particular, for each media type, including but not limited to coded video streams, coded facial and/or animation streams, coded audio streams, or coded speech streams, the unformatted access layer protocol data units (AL-PDUs) are provided to corresponding one or ones of the video decoder 231, the facial/object animation decoder 232, the image texture decoder 233, the audio decoder 234, the structured audio decoder 235 or any other provided decoder. Also, any unformatted access layer protocol data units (AL-PDUs) that corresponding to scene description representation are input to the BIFS decoder 240.

"MPEG-4 Integrated Intermedia Format (IIF): Basic Specification", A. Basso et. al., ISO/IEC/SC29/WG11 MPEG98/M2978, International Standards Organization, February 1998; "MPEG-4 Integrated Intermedia Format (IIF): Extension Specification", A. Basso et al, ISO/IEC/SC29/WG11 MPEG98/M2979, International Standards Organization, February 1998; U.S. patent application Ser. No. 09/055,933, filed Apr. 7, 1998; and U.S. patent application Ser. No. 09/067,015, filed Apr. 28, 1998; each incorporated herein by reference in its entirety, outline various embodiments of the file organization and components of an MPEG-4 file that can be input as the received MPEG-4-coded data received by the MPEG-4 audio-visual object playback system 200.

The output of the media decoders of the MPEG-4 media decoder 230, as well as the output of the BIFS decoder 240 is provided to the compositor and renderer 250. The compositor and renderer 250 can also respond to minimal user-provided control signals, such as those provided by a selection device such as a mouse, a trackball, a touch pad and the like. The minimal user-provided control signals will thus include mouse clicks and the like. The output of compositor and renderer 250 is the scene for presentation and is provided to the display process 260 for display to the user.

Figure 3:
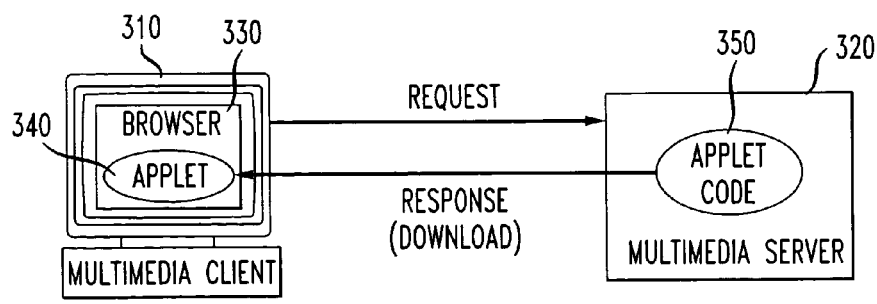
FIG. 3 is a block diagram illustrating the interaction between a multimedia client/server system when an applet is invoked.

FIG. 3 illustrates the interaction between a client 310 and a server 320 of a multimedia client/server system 300 when an applet 340 is invoked. FIG. 3 illustrates the basics of a multimedia client/server interaction when using applets, such as those in Java enabled web pages. At the client 310, a user opens a browser 330 and accesses one or more web pages stored on the server 320. If one of the web pages includes an applet 340, a Java class file, represented by the applet code 350, is downloaded from the server 320 to the client 310, where it is executed by the client 310.

FIGS. 4-7 illustrate a number of flexible MPEG-4 viewing, or browsing, systems 400-600 according to this invention. The configurations of these flexible MPEG-4 viewing, or browsing, systems range from an MPEG-4 viewing system 400 implemented as a plug-in to a web browser, an interactive MPEG-4 browser 500 that includes an MPEG-4 viewing system implemented as a partially-integrated, i.e., more tightly integrated, component of, or plug-in to, the web browser, or an integrated multimedia web browser 600 supporting MPEG and other coded multimedia content by including a fully integrated an MPEG-4 viewing system.

Figure 4:
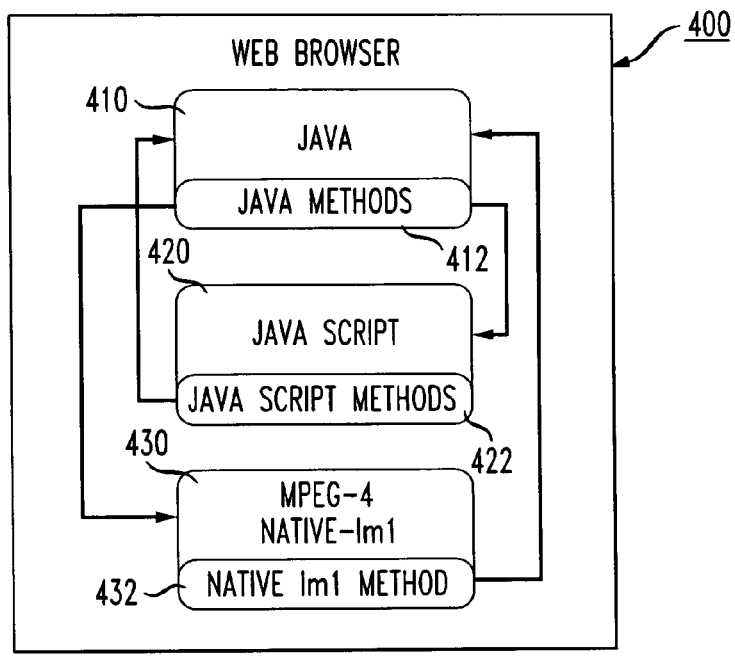
FIG. 4 is a functional block diagram outlining one exemplary embodiment of the components of a browser incorporating the MPEG-4 audio-visual objects playback system of this invention as a plug-in to the browser.

FIG. 4 is a functional block diagram outlining one exemplary embodiment of the components of a browser incorporating the MPEG-4 audio-visual object playback system of this invention as a plug-in to the browser. That is, FIG. 4 shows a configuration of the MPEG-4 audio-visual object playback system of this invention where the MPEG-4 audio-visual object playback system of this invention is implemented as a plug-in 430 to a conventional browser 400, such as a web browser. Such typical browsers support Java and JavaScript languages 410 and 420 that can call the Java methods 412 and the JavaScript methods 422 of each other. That is, the JavaScript methods 422 can call Java and Java methods 412 can call JavaScript. In this configuration, the MPEG-4 player according to this invention is implemented as an MPEG-4 Native-Im1 430, for example.

The MPEG-4 Native-Im1 430 is written in C or C++, contains a number of Native Im1 methods 432 and is shown as the native code that can be called from the Java methods 412. Furthermore, the native Im1 code methods 432 can also call the Java methods 412. It should be appreciated that the MPEG-4 Native-Im1 430 is fully compiled to provide maximal computational efficiency. However, this renders the compiled MPEG-4 Native-Im1 430 highly platform specific. In contrast, the Java and JavaScript languages 410 and 420 are at most only partially compiled, and are interpreted upon execution. This provides allows the same Java and JavaScript methods 412 and 422 to be used flexibly across many different platforms. However, this flexibility requires more computational resources when executing the Java and JavaScript methods 412 and 422.

Figure 5:
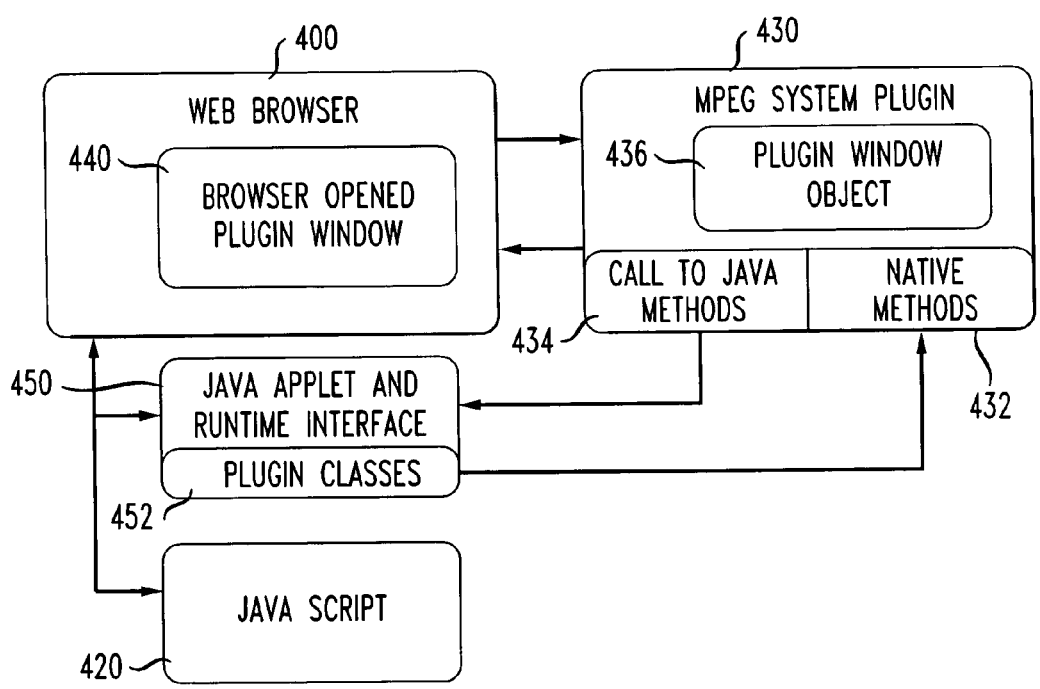
FIG. 5 is a block diagram illustrating the interaction between the components of the browser shown in FIG. 4.

FIG. 5 is a block diagram illustrating the interaction between the components of the browser 400 shown in FIG. 4. That is, FIG. 5 shows a more clarified view of the browser 400 shown in FIG. 4. As shown in FIG. 5, the MPEG system plug-in 430 can open a window 440 in the browser 400. The MPEG system plug-in window object 436 can be displayed in the window 440. Java in the browser 400 includes a Java applet and runtime interface 450. The plug-in classes 452 of the Java applet and runtime interface 450 can call the native methods 432 of the MPEG system plug-in 430, which in turn generate calls 434 to the Java methods 412 of the Java applet and runtime interface 450. At the same time, the browser 400 can call the JavaScript 420.

Figure 6:
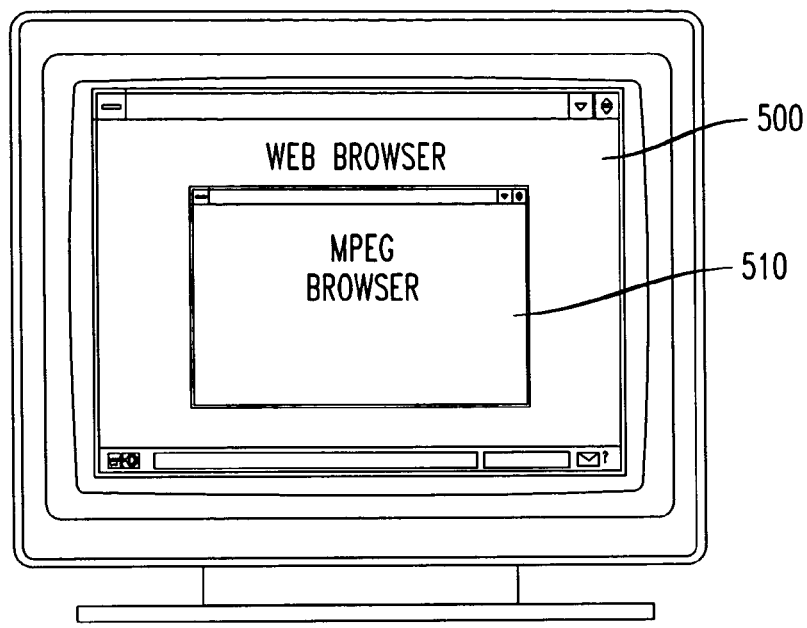
FIG. 6 is a functional block diagram outlining one exemplary embodiment of the components of a browser that partially integrates the MPEG-4 audio-visual objects playback system of this invention to support MPEG coded content.

FIG. 6 is a functional block diagram outlining one exemplary embodiment of the components of a browser 500 that partially integrates the MPEG-4 audio-visual object playback system 510 of this invention to support MPEG coded content. That is, FIG. 6 shows a higher level of integration of MPEG-4 system functionality in the form of a MPEG Browser 510 that may be a plug-in or may be a component of the general purpose Browser 500.

Figure 7:
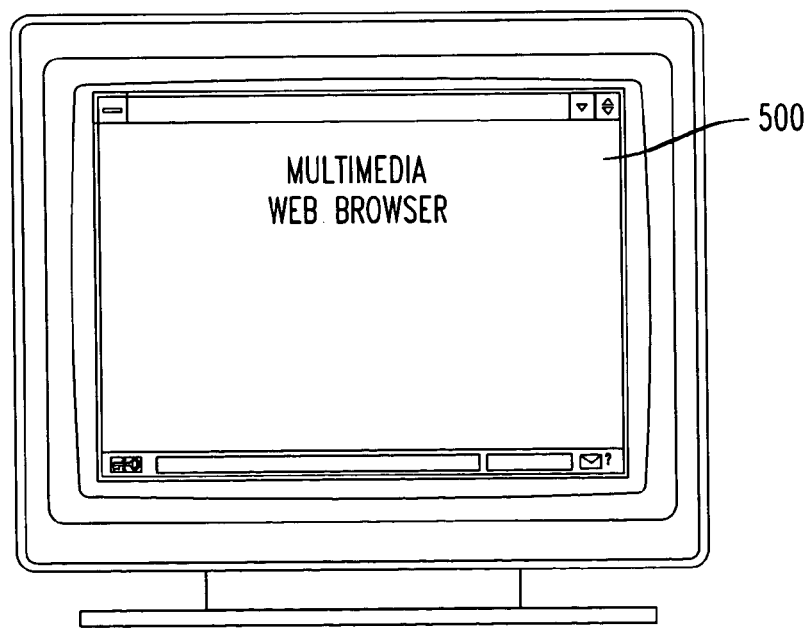
FIG. 7 is a functional block diagram outlining one exemplary embodiment of the components of a browser that fully integrates the MPEG-4 audio-visual objects playback system of this invention to support MPEG and other multimedia coded content.

FIG. 7 is a functional block diagram outlining one exemplary embodiment of the components of a browser 600 that fully integrates the MPEG-4 audio-visual object playback system of this invention to support MPEG and other multimedia coded content. That is, FIG. 7 shows an even higher level of integration between the browser 500 and the MPEG browser 510 of FIG. 6. The multimedia web browser 600 of FIG. 7 allows browsing of not only MPEG-encoded multimedia data but also multimedia data encoded by other methods.

FIGS. 8-16 illustrate concepts and details of a number of MPEG-4 browser configurations, starting with the least flexible MPEG-4 browser configuration and moving to increasingly flexible MPEG-4 browser configurations, ending with the highly flexible AAVS MPEG-4 (or MPEG-J) browser configuration.

Figure 8:
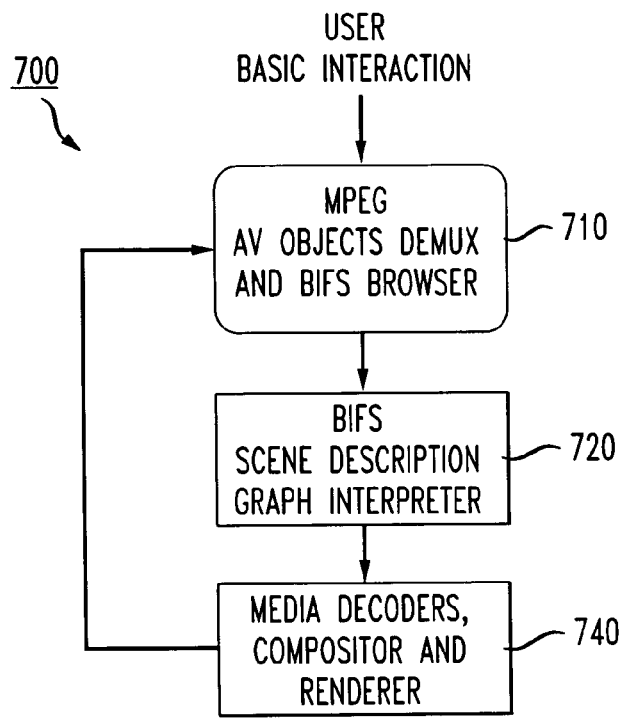
FIG. 8 is a functional block diagram illustrating the data flow between the components of a first exemplary embodiment of an MPEG-4 audio-visual object browser system of this invention.

FIG. 8 is a functional block diagram illustrating the data flow between the components of a first exemplary embodiment of an MPEG-4 audio-visual object browser system 700 of this invention. As shown in FIG. 8, the basic MPEG-4 audio-visual object browser system 700 for browsing MPEG-4 coded content includes an MPEG audio-visual objects demultiplexer and BIFS browser 710, a BIFS scene description graph interpreter 720, and a media decoders, compositor and renderer 740. Basic user interaction directly with the MPEG audio-visual objects demultiplexer and BIFS browser 710 is possible through a user-controlled input device, such as a mouse, a trackball, a touch pad or the like. The BIFS scene description graph interpreter 720 is capable of understanding the scene and invoking the needed media decoders of the media decoders, compositor and renderer 740 for interpreting the content. The decoded audio-visual objects are composited and presented by the media decoders, compositor and renderer 740 to the MPEG audio-visual objects demultiplexer and BIFS browser 710.

Figure 9:
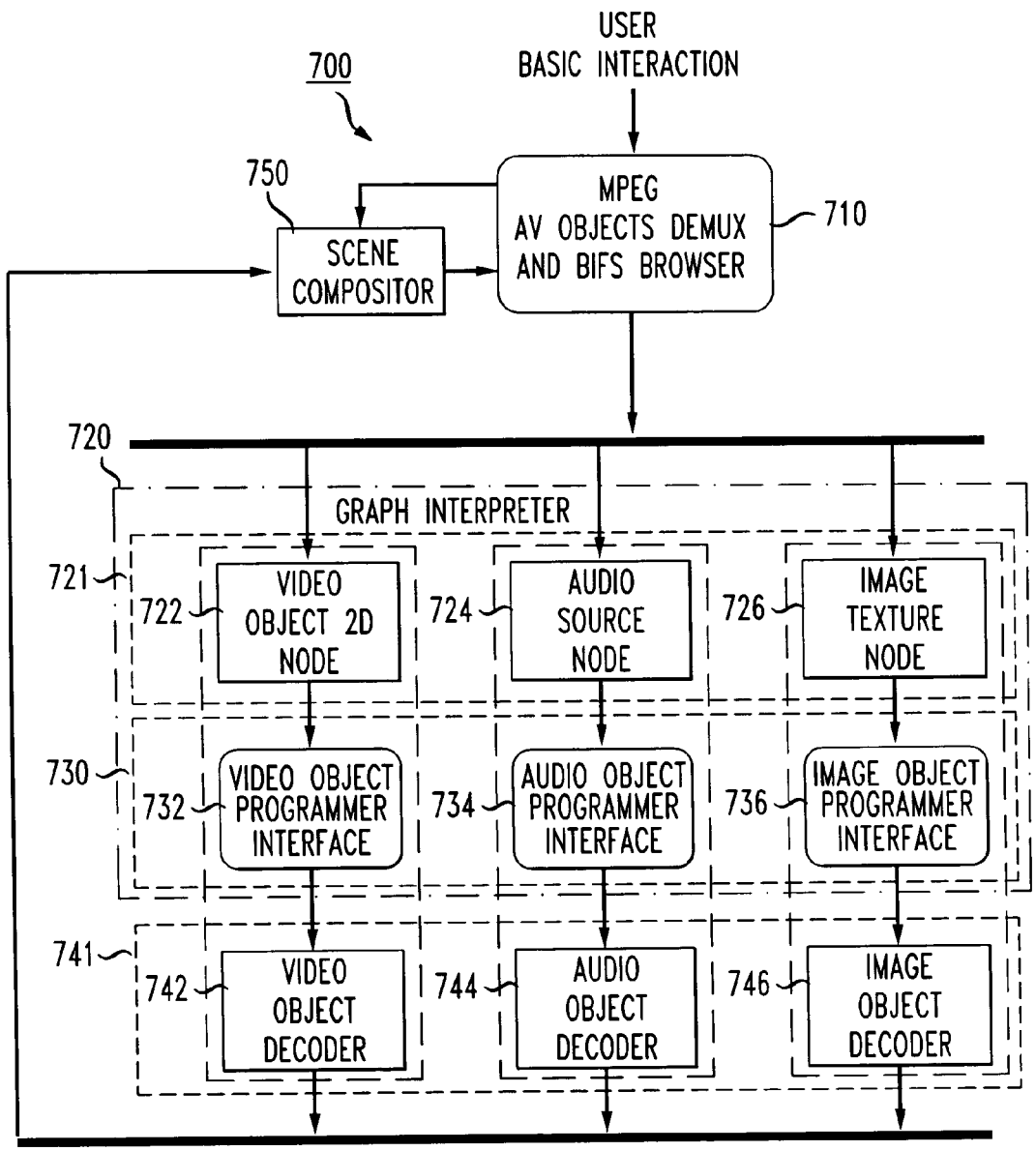
FIG. 9 is a functional block diagram outlining in greater detail a first exemplary embodiment of the scene description graph interpreter and media decoders of the MPEG-4 audio-visual object browser system of FIG. 8.

FIG. 9 is a functional block diagram outlining in greater detail a first exemplary embodiment of the scene description graph interpreter and media decoders of the MPEG-4 audio-visual object browser system 700 of FIG. 8. However, it should be appreciated that the organization of the scene description graph interpreter, media decoders and scene compositor of the MPEG-4 audio-visual object browser system 700 shown in FIG. 9 does not exactly correspond to the MPEG-4 audio-visual object browser system 700 shown in FIG. 8. This is merely an artifact of the different ways to visualize the different functional components of the MPEG-4 audio-visual object browser system 700, rather than an actual difference in the functions or operation between the MPEG-4 audio-visual object browser system 700 shown in FIGS. 8 and 9.

In FIG. 9 the linkage of the BIFS scene description graph interpreter 720 to the media decoders, compositor and renderer 740 of FIG. 8 is clarified. Depending on the contents of the scene description graph, a number of different nodes 721 of the BIFS scene description graph interpreter 720 are invoked. For example, in the exemplary embodiment shown in FIG. 9, the contents of the scene description graph require invoking a VideoObject2D node 722, an AudioSource node 724 and an ImageTexture node 726 of the BIFS scene description graph interpreter 720. The VideoObject2D node 722, the AudioSource node 724 and the Image texture node 726 correspondingly deal with the video, audio and image content by attaching the appropriate decoders 741 of the media decoders, compositor and renderer 740. The appropriate decoders 741 of the media decoders, compositor and renderer 740 decode the corresponding encoded portions of the MPEG-4-encoded data and output the decoded data to a scene compositor 750 of the media decoders, compositor and renderer 740. It should be appreciated that the VideoObject2D node 722 has been renamed as the MovieTexture node in later versions of the MPEG-4 standard. However, the functionality of the MovieTexture node is substantially the same as that of the VideoObject2D node 722.

The BIFS scene description graph interpreter 720 also includes the corresponding programmer interfaces 730 between the nodes 721 of the BIFS scene description graph interpreter 720 and the corresponding decoders 741 of the media decoders, compositor and renderer 740. For example, in the exemplary embodiment shown in FIG. 9, the programmer interfaces 730 of the BIFS scene description graph interpreter 720 include a video object programmer interface 732 (i.e., a movie texture programmer interface), an audio object programmer interface 734 and an image object programmer interface 736. Similarly, in the exemplary embodiment shown in FIG. 9, the appropriate decoders 741 of the media decoders, compositor and renderer 740 include a video object decoder 742, an audio object decoder 744 and an image object decoder 746.

Figure 10:
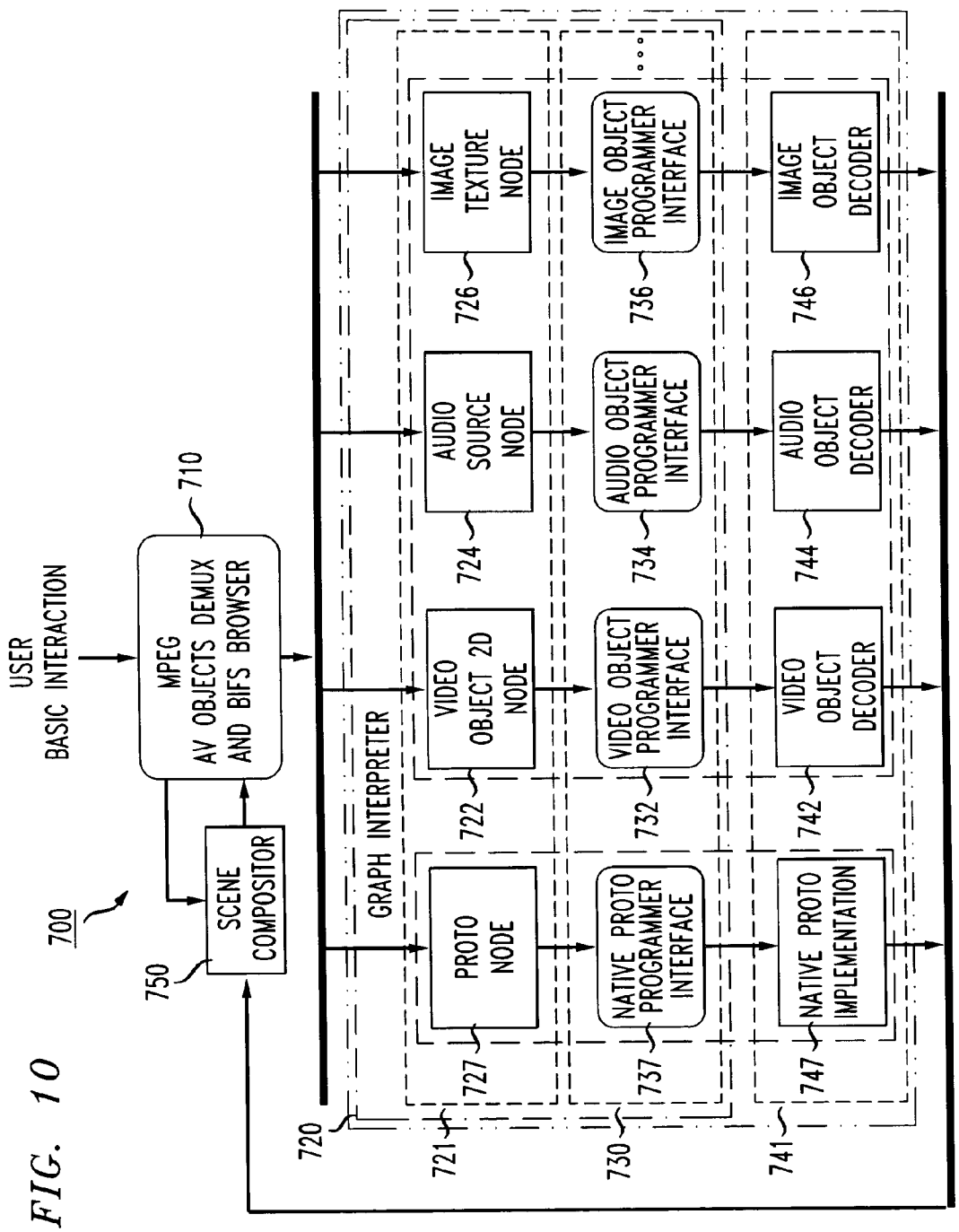
FIG. 10 is a functional block diagram outlining in greater detail a second exemplary embodiment of the scene description graph interpreter and media decoders of the MPEG-4 audio-visual object browser system of FIG. 8.

FIG. 10 is a functional block diagram outlining in greater detail a second exemplary embodiment of the scene description graph interpreter 720 and the media decoders, compositor and renderer 740 of the MPEG-4 audio-visual object browser system 700 of FIG. 8;

FIG. 10 extends the scene description graph interpreter 720 and the media decoders, compositor and renderer 740 of FIG. 9 to include a "Proto" node 727 and a native proto programmer interface 737 in the scene description graph interpreter 720 and a native proto implementation 747 in the media decoders, compositor and renderer 740. Including the proto node 727 allows the scene description graph interpreter 720 to use 'canned nodes' as an extension to the nodes officially supported by the scene description graph interpreter 720. The new canned nodes can be defined by a DEF statement in the scene description graph and used by a USE statement in the scene description graph. The canned nodes can modify some aspects of a known node by programming its behavior. However, it should be appreciated that the "Proto" node 727 is not yet officially included in the BIFS standard for the scene description graph interpreter 720.

Figure 11:
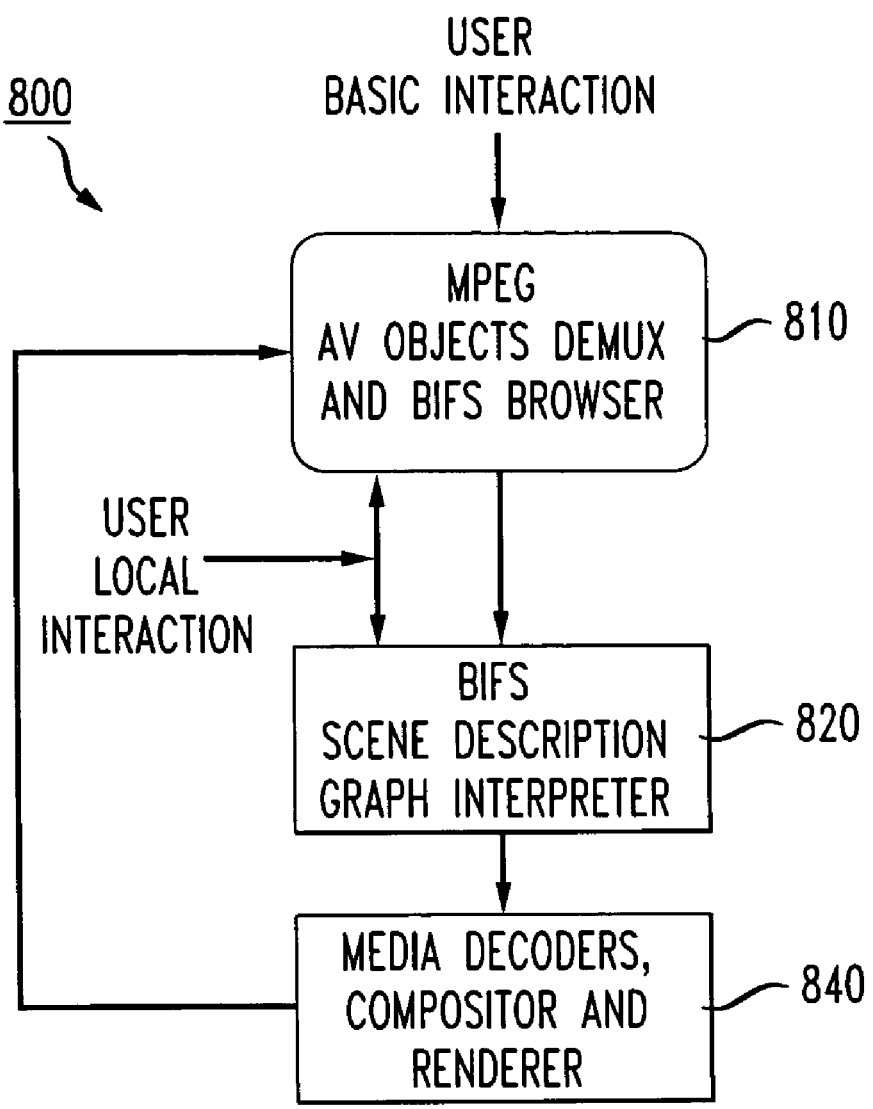
FIG. 11 is a functional block diagram illustrating the data flow between the components of a second exemplary embodiment of an MPEG-4 audio-visual object browser system of this invention.

There has been much discussion during creation of the MPEG-4 standard for the need for a Script node in the scene description graph interpreter 720 to support scripting, such as the scripting used in VRML. FIG. 11 is a functional block diagram illustrating the data flow between the components of a second exemplary embodiment of an MPEG-4 audio-visual object browser system 800 of this invention. In particular, in this second exemplary embodiment of an MPEG-4 audio-visual object browser system 800, the MPEG-4 audio-visual object browser system 800 supports user local interaction through scripting.

As shown in FIG. 11, the second exemplary embodiment of the MPEG-4 audio-visual object browser system 800 includes an MPEG audio-visual objects demultiplexer and BIFS browser 810, a BIFS scene description graph interpreter 820 and a media decoders, compositor and renderer 840. Basic user interaction directly with the MPEG audio-visual objects demultiplexer and BIFS browser 810 is possible through a user-controlled input device, such as a mouse, a trackball, a touch pad or the like. Additional user interaction, i.e., local interaction, can occur in the form of behavior programming via use of scripting. This local user interaction through scripting can be used to interact with either or both of the MPEG audio-visual objects demultiplexer and BIFS browser 810 and the BIFS scene description graph interpreter 820.

The BIFS scene description graph interpreter 820 is capable of understanding the scene and invoking the needed media decoders of the media decoders, compositor and renderer 840 for interpreting the content. The decoded audio-visual objects are composited and presented by the media decoders, compositor and renderer 840 to the MPEG audio-visual objects demultiplexer and BIFS browser 810.

Figure 12:
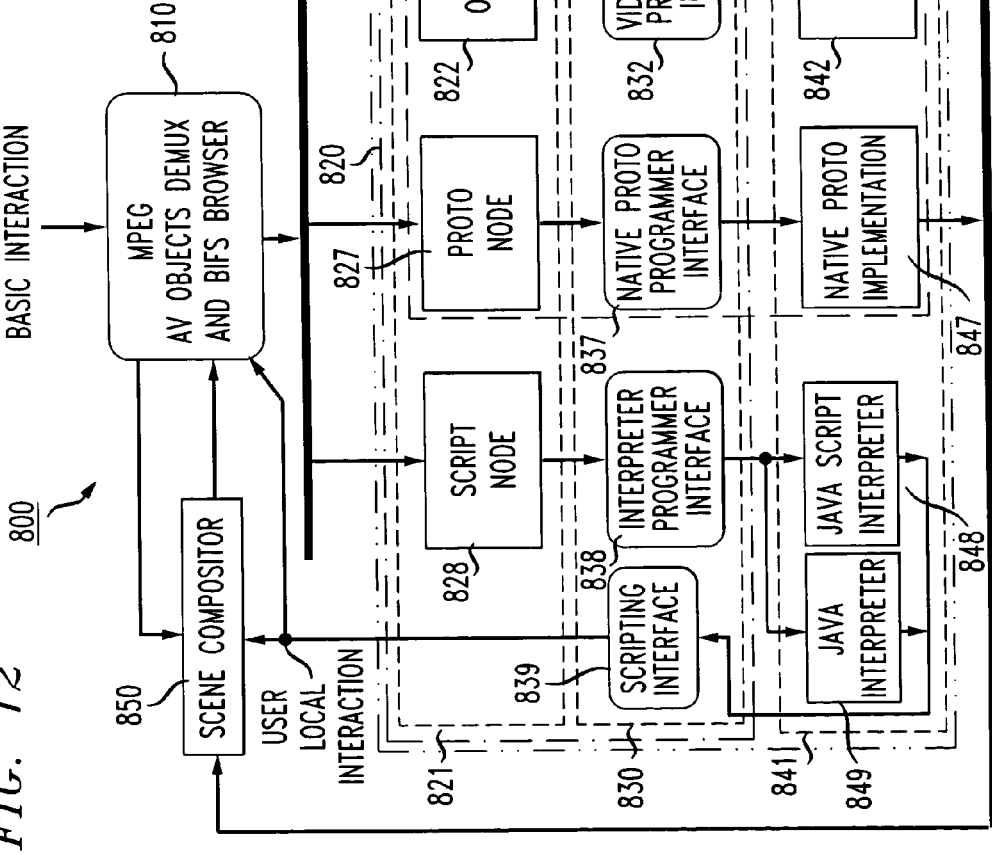
FIG. 12 is a functional block diagram outlining in greater detail one exemplary embodiment of the local interaction interface, scene description graph interpreter and media decoders of the MPEG-4 audio-visual object browser system of FIG. 11.

FIG. 12 is a functional block diagram outlining in greater detail one exemplary embodiment of the local interaction interface, scene description graph interpreter 820 and the media decoders, compositor and renderer 840 of the MPEG-4 audio-visual object browser system 800 of FIG. 11. However, it should be appreciated that the organization of the scene description graph interpreter, media decoders and scene compositor of the MPEG-4 audio-visual object browser system 800 shown in FIG. 12 does not exactly correspond to the MPEG-4 audio-visual object browser system 800 shown in FIG. 11. This is merely an artifact of the different ways to visualize the different functional components of the MPEG-4 audio-visual object browser system 800, rather than an actual difference in the functions or operation between the MPEG-4 audio-visual object browser system 800 shown in FIGS. 11 and 12.

As shown in FIG. 12 the linkage of the BIFS scene description graph interpreter 820 to the media decoders, compositor and renderer 840 of FIG. 11 is clarified. Depending on the contents of the scene description graph, a number of different nodes 821 of the BIFS scene description graph interpreter 820 are invoked. For example, in the second exemplary embodiment shown in FIG. 12, the contents of the scene description graph require invoking a VideoObject2D node 822 (i.e., a MovieTexture node), an AudioSource node 824, an ImageTexture node 826 and a Proto node 827 of the BIFS scene description graph interpreter 820. The VideoObject2D node 822, the AudioSource node 824 and the Image texture node 826 correspondingly deal with the video, audio and image content by attaching the appropriate decoders 841 of the media decoders, compositor and renderer 840. The appropriate decoders 841 of the media decoders, compositor and renderer 840 decode the corresponding encoded portions of the MPEG-4-encoded data and output the decoded data to a scene compositor 850 of the media decoders, compositor and renderer 840.

The BIFS scene description graph interpreter 820 also includes the corresponding programmer interfaces 830 between the nodes 821 of the BIFS scene description graph interpreter 820 and the corresponding decoders 841 of the media decoders, compositor and renderer 840. For example, in the exemplary embodiment shown in FIG. 9, the programmer interfaces 830 of the BIFS scene description graph interpreter 820 include a video object programmer interface 832 (i.e., a movie texture programmer interface), an audio object programmer interface 834 and an image object programmer interface 836 a native proto programmer interface 837. Similarly, in the exemplary embodiment shown in FIG. 9, the appropriate decoders 841 of the media decoders, compositor and renderer 840 include a video object decoder 842, an audio object decoder 844, an image object decoder 846 and a native proto implementation 747.

As described above with respect to FIG. 10, including the proto node 827 allows the scene description graph interpreter 820 to use 'canned nodes' as an extension to the nodes officially supported by the scene description graph interpreter 820. The new canned nodes can be defined by a DEF statement in the scene description graph and used by a USE statement in the scene description graph. The canned nodes can modify some aspects of a known node by programming its behavior. However, it should be appreciated that the "Proto" node 827 is not yet officially included in the BIFS standard for the scene description graph interpreter 820.

Additionally, as shown in FIG. 12, the nodes 821 of the BIFS scene description graph interpreter 820 also include a Script node 827, while the programmer interfaces 830 of the BIFS scene description graph interpreter 820 also include an interpreter programmer interface 838. Similarly, the appropriate decoders 841 of the media decoders, compositor and renderer 840 include a JavaScript interpreter 848 and a Java interpreter 849. The Script node 827 offers local flexibility for behavior programming and can be considered as closely related to adaptive audio visual session (AAVS or MPEG-J), if it is not pure adaptive audio visual session.

The programmer interfaces 830 of the BIFS scene description graph interpreter 820 also include a scripting interface 839. The scripting interface 839 inputs the interpreted script commands from the JavaScript interpreter 848 and/or the Java interpreter 849. The output of the scripting interface 839 is connected to the MPEG audio-visual objects demultiplexer and BIFS browser 810 and the scene compositor 850.

However, it should be appreciated that the "Script" node 829, like the Proto nodes 727 and 827, is not yet officially included in the BIFS standard for the scene description graph interpreter 820. However, the Script node 829 is supported by VRML. It should further be appreciated that adaptive audio visual session (AAVS or MPEG-J) can be thought of as related to the VRML External Authoring Interface (EAI).

Figure 13:
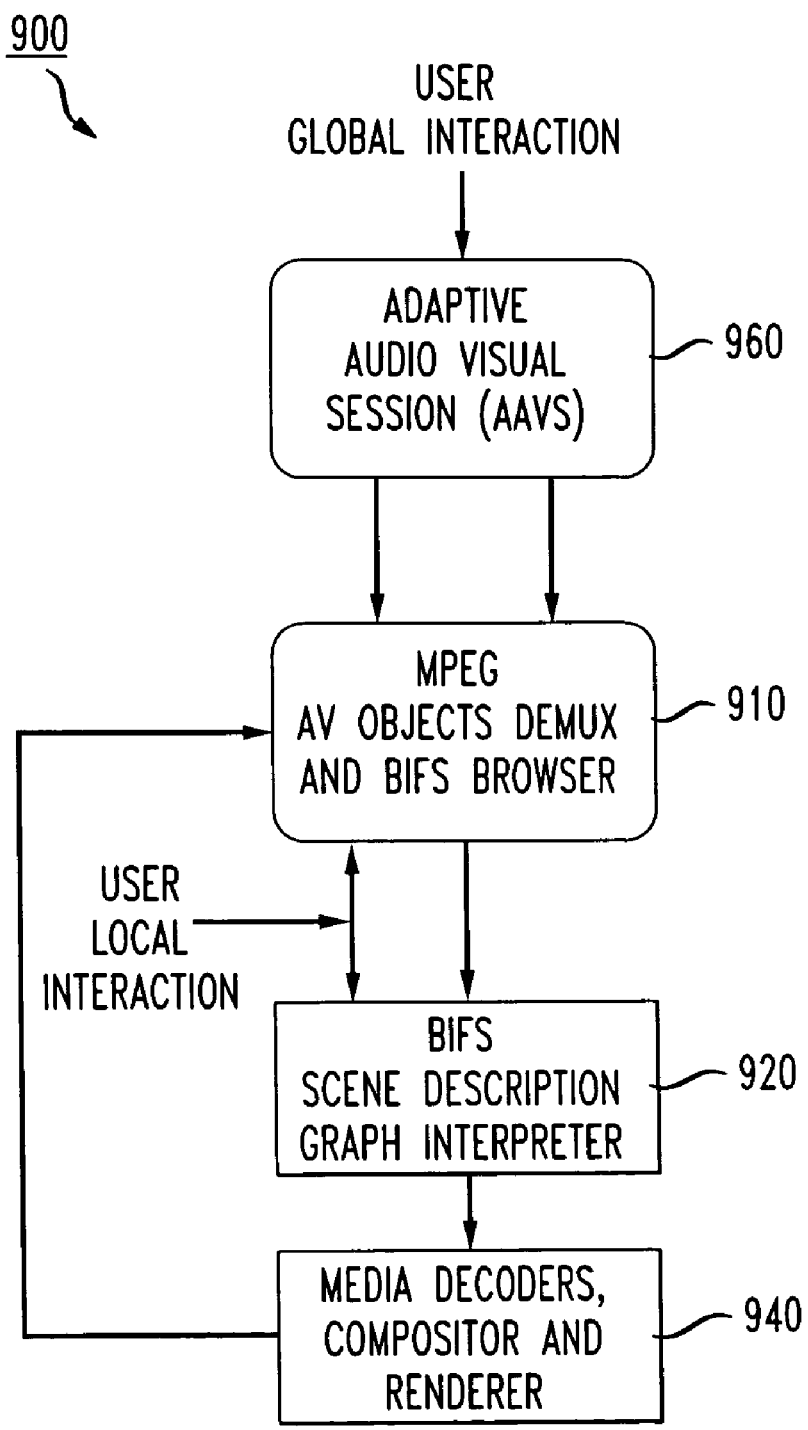
FIG. 13 is a functional block diagram illustrating the data flow between the components of a third exemplary embodiment of an MPEG-4 audio-visual object browser system of this invention.

FIG. 13 is a functional block diagram illustrating the data flow between the components of a third exemplary embodiment of an MPEG-4 audio-visual object browser system 900 of this invention. In particular, in this third exemplary embodiment of an MPEG-4 audio-visual object browser system 900, the MPEG-4 audio-visual object browser system 800 not only supports user local interaction through scripting, but further provides a more flexible system than that of FIG. 11 for MPEG-4 browsing and interaction, including navigation.

As shown in FIG. 13, the third exemplary embodiment of the MPEG-4 audio-visual object browser system 900 includes an MPEG audio-visual objects demultiplexer and BIFS browser 910, a BIFS scene description graph interpreter 920 and a media decoders, compositor and renderer 940. Local user interaction can occur in the form of behavior programming via use of scripting. This local user interaction through scripting can be used to interact with either or both of the MPEG audio-visual objects demultiplexer and BIFS browser 910 and the BIFS scene description graph interpreter 920. However, in contrast to the first and second exemplary embodiments of the MPEG-4 audio-visual object browser systems 700 and 800 described above, in the third exemplary embodiment of the MPEG-4 audio-visual object browser system, basic user interaction is not directly with the MPEG audio-visual objects demultiplexer and BIFS browser 910. Rather basic user interaction is directly with an adaptive audio visual session (AAVS) module 960 that sits between the basic user interaction and the MPEG audio-visual objects demultiplexer and BIFS browser 910. Nonetheless, basic user interaction remains possible through a user-controlled input device, such as a mouse, a trackball, a touch pad or the like.

The BIFS scene description graph interpreter 920 is capable of understanding the scene and invoking the needed media decoders of the media decoders, compositor and renderer 940 for interpreting the content. The decoded audio-visual objects are composited and presented by the media decoders, compositor and renderer 940 to the MPEG audio-visual objects demultiplexer and BIFS browser 910.

The adaptive audio visual session (AAVS) module 960 is invoked as an applet for controlling the MPEG audio-visual objects demultiplexer and BIFS browser 910. The adaptive audio visual session (AAVS) module 960 potentially supports a high degree of user interaction with the scene. This interaction is referred to as user global interaction rather than basic user interaction. The adaptive audio visual session (AAVS) module 960 passes both the control information and data, such as, for example, scene updates, to the MPEG audio-visual objects demultiplexer and BIFS browser 910. However, it should be appreciated that the adaptive audio visual session (AAVS) module 960 is conceptualized to just an additional layer interfacing the user with the scene.

Figure 14:
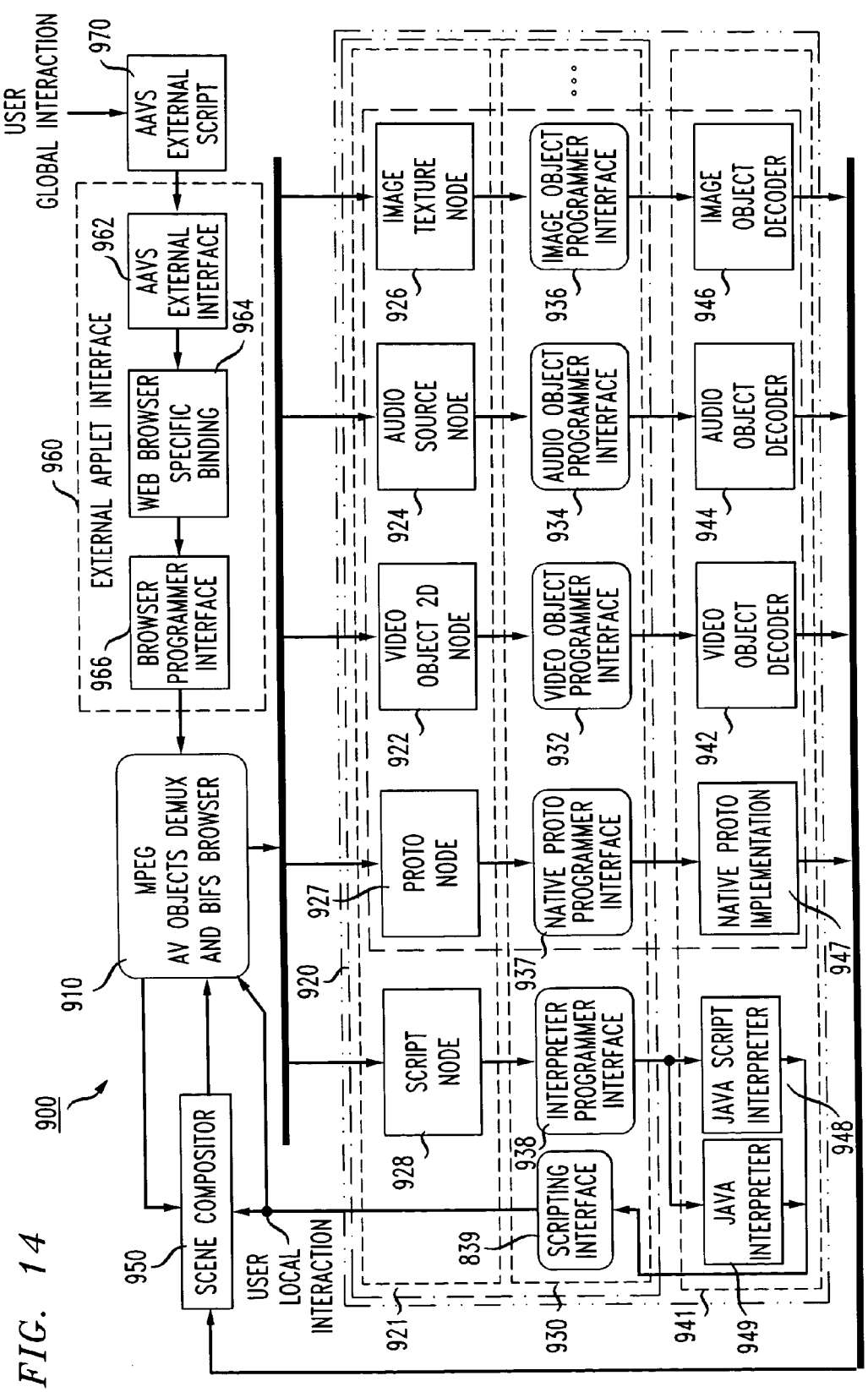
FIG. 14 is a functional block diagram outlining in greater detail one exemplary embodiment of the external applet interface, local interaction interface, scene description graph interpreter and media decoders of the MPEG-4 audio-visual object browser system of FIG. 11.

FIG. 14 is a functional block diagram outlining in greater detail one exemplary embodiment of the external applet interface, local interaction interface, scene description graph interpreter and media decoders of the MPEG-4 audio-visual object browser system of FIG. 11. That is, FIG. 14 illustrates the architectural details of the MPEG-4 audio-visual object browser system 900 of FIG. 13. Because the structure and operation of the MPEG-4 audio-visual object browser system 900 is essentially identical to the structure and operation of the MPEG-4 audio-visual object browser system 800 of FIG. 11 except for the external applet interface 960, only the external applet interface 960 will be described in detail.

The external applet interface 960 includes an AAVS external interface 962, a browser specific binding 964 and a browser programmer interface 966. It should be appreciated that the browser specific binding 964 can be implemented using Netscape Corp.'s LiveConnect technology or Microsoft Corp.'s ActiveX technology.

A user interacts with the MPEG-4 audio-visual object browser system 900, through user global interaction, to program or reprogram the behavior of the scene using external scripting. This script is an AAVS external script 970. This AAVS external script 970 is provided to the MPEG audio-visual objects demultiplexer and BIFS browser 910 through the AAVS external interface 962, the browser specific binding 964 and the browser programmer interface 966. It should be appreciated that this assumes that the MPEG audio-visual objects demultiplexer and BIFS browser 910 exists within the context of a browser. Further, the AAVS external script 970 is assumed to employ Java.

Figure 15:
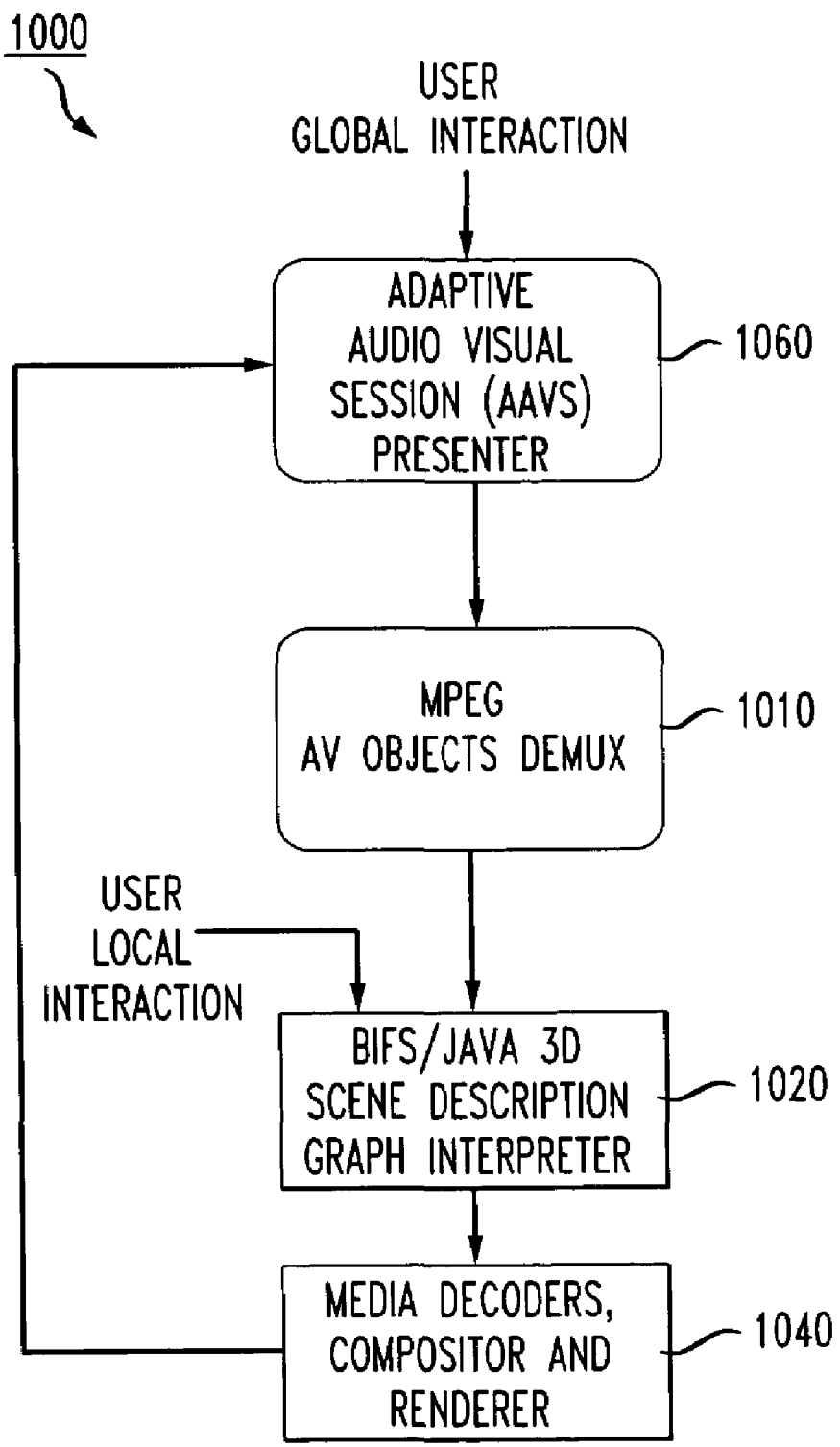
FIG. 15 is a functional block diagram illustrating the data flow between the components of a fourth exemplary embodiment of an MPEG-4 audio-visual object browser system of this invention.

As clarified earlier, AAVS (i.e., MPEG-J) is an applet-based system. In fact, it should be possible to use AAVS (i.e., MPEG-J) as an application rather than applet. FIG. 15 clarifies this view. In particular, FIG. 15 is a functional block diagram illustrating the data flow between the components of a fourth exemplary embodiment of an MPEG-4 audio-visual object browser system 1000 of this invention.

As shown in FIG. 15, the fourth exemplary embodiment of the MPEG-4 audio-visual object browser system 1000 includes an MPEG audio-visual objects demultiplexer 910, a BIFS/Java 3D scene description graph interpreter 1020, a media decoders, compositor and renderer 1040, and an adaptive audio visual session (AAVS) and presenter module 1060 that sits between the user global interaction and the MPEG audio-visual objects demultiplexer 1010. Local user interaction can occur in the form of behavior programming via use of scripting. This local user interaction through scripting can be used to interact with the BIFS/Java 3D scene description graph interpreter 1020.

It should be appreciated that the MPEG-4 audio-visual object browser system 1000 uses control from an application rather than an applet. For generality, the MPEG-4 audio-visual object browser system 1000 is shown to operate without a browser, although the MPEG-4 audio-visual object browser system 1000 supports both the user local interaction and the user global interaction. Further, for generality not only a BIFS scene graph but also other forms of scene graph, such as, for example, Java3D, can be controlled.

The BIFS/Java 3D scene description graph interpreter 1020 is capable of understanding the scene and invoking the needed media decoders of the media decoders, compositor and renderer 1040 for interpreting the content. The decoded audio-visual objects are composited and presented by the media decoders, compositor and renderer 1040 to the adaptive audio visual session (AAVS) and presenter module 1060.

The adaptive audio visual session (AAVS) and presenter module 1060 potentially supports a high degree of user global interaction with the scene. The adaptive audio visual session (AAVS) and presenter module 1060, rather than passing the control information and data, such as, for example, scene updates, to the MPEG audio-visual objects demultiplexer and BIFS browser 910, can choose to directly operate on the control information and data.

The above-outlined MPEG-4 audio-visual object browser systems 200-1000 allow the user to easily manipulate an MPEG-4-encoded scene. As described above, in MPEG-4, each frame is decomposed into a plurality of different objects and a scene description graph that indicates where each object appears in that frame. Each object resides in its own video object plane that defines at least that object's shape, motion, opaqueness and color, including surface texture. The scene description graph defines the spatial location of each object within the bounds of the frame. The scene description graph also defines the position of each object within the depth of the frame, i.e., which objects are "in front of" which other objects.

Accordingly, because each object is encoded independently of all other objects, and the objects are related to each other to represent the scene only by the scene description graph, any object or the scene description graph can be manipulated by the user to alter the resulting scene. That is, by altering the scene description graph, the user can modify the position of any object within the scene, add new objects to the scene or delete currently-included objects from the scene. In particular, the added new objects can be synthetic objects created using VRML or BIFS.

For example, the position of an object can be altered by modifying the scene description graph to change the defined location of that object. Thus, when the compositor 250-1050 collects all of the decoded objects and composes them into the scene, the compositor 250-1050 determines where to place each object in the scene according to the location defined in the scene description graph. By changing the location defined in the scene description graph for an object, the position of that object in the composed scene changes.

Similarly, the scene description graph can also be modified to change the relative position of an object relative to the depth of the scene. That is, the relative depth of an object in the scene can be changed so that it appears behind rather that in front of another object, or vise versa. Additionally, in a three-dimensional scene, changing the z-axis position of an object defined in the scene description graph, assuming the x-axis and y-axis positions define the left-to-right and top-to-bottom position of the object, modifies the position of the object in the scene.

Moreover, an object can be added to the scene by adding a description of that object to the scene description graph. If the object is a synthetic object, the scene description graph will be modified to fully describe the appearance of that object, according to VRML or BIFS, and to define the location of that object within the scene. If the object is an MPEG-4-encoded object, the scene description graph will be modified to identify the VOP containing that object and to define the location of that object within the scene.

If an object is to be deleted from the scene, the scene description graph will be modified to remove the nodes relating to that object from the scene description graph. This can be accomplished by either completely removing any mention of that object from the scene description graph, or by preventing the MPEG-4 audio-visual object browser systems 200-1000 from processing the nodes relating to that object. This can be accomplished by adding a code to each node referencing that object, such as by adding a remark code to each such node. Accordingly, because the nodes relating to that node are either removed or are not processed, that object is not added to the scene when the compositor 250-1050 composes the scene from the scene description graph.

It should further be appreciated that these modifications to the scene description graph can be performed by the user either using user global interaction or user local interaction, as described above. Modification of the scene using user global interaction can be programmatic, such as via Java applets or JavaScript scripts to modify the scene description graph.

In modifying the scene using user local interaction, a user can interactively manipulate a scene displayed using the MPEG-4 audio-visual object browser systems 200-1000. In particular, the user can select an object within the displayed scene and drag that object to a different location within the scene. The user can also copy the selected object to a clipboard or cut it from the scene on to the clipboard. The user can then paste that object into a different scene, or can paste a copy of that object into the first scene. The user can also paste any other object in the clipboard into the first scene at any arbitrary location.

Recently, AAVS (i.e., MPEG-J) in MPEG has generated much attention due to the promise of the enhanced user interactivity that is needed by many anticipated applications. Requirements have been collected for some applications while many other applications are envisaged but their requirements generally understood are difficult to crystallize. The work on collection of requirements should continue to help maintain the focus for AAVS (i.e., MPEG-J) work. However, the technology aspect of AAVS (i.e., MPEG-J) has had similar uncertainty as well, since some of the AAVS (i.e., MPEG-J) work was started fairly early on in MPEG when even a fixed solution did not exist. Eventually, BIFS reached a mature stage and MPEG has the needed key functionality. The AAVS (i.e., MPEG-J) technology work was subsequently modified several times. In MPEG-4, the promise of AAVS (i.e., MPEG-J) technology can finally be fulfilled but a clear direction is needed which minimizes overlap and adds increased value to systems tools offering.

There has been some debate whether a BIFS based solution needs to be made more flexible, for example, by incorporating Script nodes as described above. There has also been debate on which language may be appropriate for scripting. AAVS (i.e., MPEG-J) and the relationship with scripting has been mentioned but not clearly understood mainly because many of the discussions take place in context of VRML, which, although very important for MPEG-4, is also inherently different at times.

As mentioned earlier, in MPEG-4, there has been much debate about the similarities and differences between scripting and AAVS (i.e., MPEG-J) and regarding the language to be used for scripting. To settle the later debate, both JavaScript and Java have their roles for scripting. JavaScript is needed for quick and dirty solutions, while Java is needed for programming more complex behaviors. Further, JavaScript is directly interpreted, i.e., JavaScript does not need to be compiled, has a relatively smaller footprint, is relatively less secure, is without graphics library support other than that supported via HTML, and is without networking support other than that supported via the web browser. In comparison, Java is compiled and then interpreted, is more secure, has graphics and networking support, has a bigger footprint, and is multimedia capable, through "JavaMediaFramework". Therefore, it should be possible to support both the scripting languages in different profiles or at different levels of the same profile.

On the issue of scripting versus external (AAVS (i.e., MPEG-J)) interface, although there is potentially some area of overlap between the two, they also differ in capabilities they introduce. While scripting can easily allow local behavior programming or control within a scene, external interface allows global behavior programming or control. Thus, again, they offer somewhat different functionalities. This issue should also be handled via appropriate definition of systems profiles.

We now discuss the approach MPEG AAVS (i.e., MPEG-J) could follow in defining its API. The rationale of the proposal is based on the apparent commonality of the AAVS (i.e., MPEG-J) work with that of Liquid Reality. Liquid Reality is a platform independent VRML toolkit written in Java. In fact, Liquid Reality is a set of developer tools. Liquid Reality supports the functionalities of parsing, rendering and authoring VRML compliant files, as well as interactively manipulating the scene graph. Liquid Reality is not just one API but a collection of several APIs and includes an API to manipulate VRML nodes, level APIs to do 3D math, rendering and more. Liquid Reality includes 11 Java packages: "dnx.geom"; "dnx.ice"; "dnx.util"; "dnx.awtutil"; "dnx.lr"; "dnx.lr.field"; "dnx.lr.node"; "dnx.lr.app"; "vrml"; "vrml.field"; and "vrml.node".

The dnx.geom package contains code for 3D-math, such as storing/manipulating 2, 3 and 4 components vector and matrices. The functionality of this package is also included in Java3D.

The dnx.ice package provides wrapper classes allowing access to low-level rendering package, such as OpenGL, Direct3D and ICE.

The dnx.util and dnx.awtutil packages contain classes used internally by Liquid Reality.

The dnx.lr package is a VRML node and scene graph manipulation package.

The dnx.lr.node package contains a class for each of the nodes of VRML and 10 other Liquid Reality specific classes.

The dnx.lr.app package contains classes that provide framework for VRML applet or application.

The vrml, vrml.field and vrml.node packages contain standard implementation of VRML.

The dnx.lr.field package contains classes for each field type defined in VRML. That is, the dnx.lr.field package is similar to but a superset of the vrml.field package.

Perhaps the MPEG-4 AAVS (i.e., MPEG-J) packages can be patterned after Liquid Reality. However, MPEG-4 may not need some of the packages of Liquid Reality and may alternatively add some new packages. This is a similar to the relationship of BIFS with VRML. As a more concrete example, the following packages could be used for the AAVS (i.e., MPEG-J): "mpg.geom"; "mpg.rend"; "mpg.util"; "mpg.aavs"; "mpg.aavs.field"; "mpg.aavs.node"; "mpg.aavs.app"; "mpg.aavs.ui"; and "mpg.aavs.dev".

The mpg.geom package could be formed by taking the appropriate subset of Java3D and would support code for 3D-math.

The mpg.rend package could provide wrapper classes allowing access to low-level rendering package such as OpenGL and Direct3D or alternatively could provide access to Im1 which in turn could call low-level rendering packages.

The mpg.util package would include utilities internal to MPEG as required.

The mpg.aavs package could be the package for BIFS node and scene graph manipulation.

The mpg.aavs.field package could contain classes for each field type defined in BIFS.

The mpg.aavs.node package could contain class for each of the nodes of BIFS.

The mpg.aavs.app package could contain classes that provide framework for MPEG based applet or application. Interfaces to JavaMediaFramework may also be necessary.

The mpg.aavs.ui package could contain classes for user interaction.

The mpg.aavs.dev package could contain classes that provide framework for device and networking interface.

Figure 16:
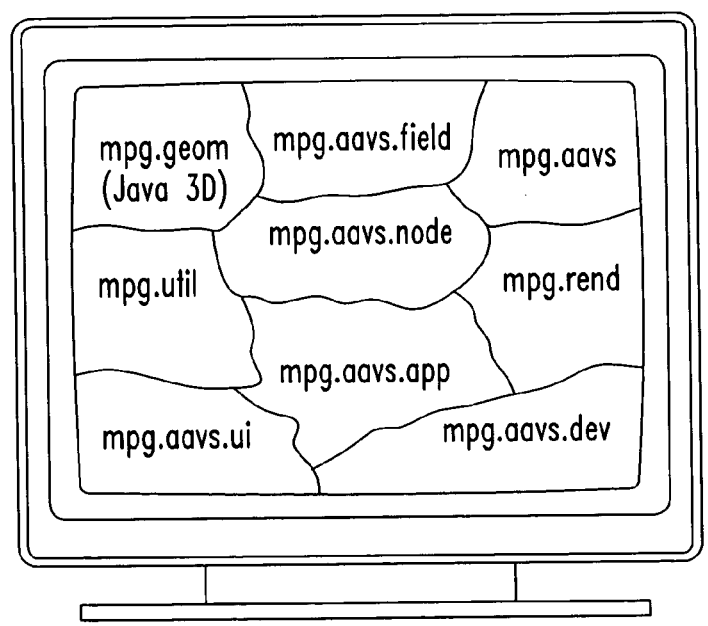
FIG. 16 illustrates one example of a set of MPEG-4 adaptive audio visual session application program interfaces.

FIG. 16 is the composite picture for packages of MPEG-4 adaptive audio visual session application program interfaces (AAVS (i.e., MPEG-J) APIs). If it is deemed necessary, other packages could be added or functionalities included in some of the packages could be modified; we have only tried to present an example based on our current understanding.

In parallel to decision regarding the AAVS (i.e., MPEG-J) API, the development environment in MPEG may also need to be standardized to facilitate speedy development of AAVS (i.e., MPEG-J). In particular, decisions are needed regarding the versions of the following.

Some of current AAVS (i.e., MPEG-J) work (by Sun) is based on JDK1.1.4. A bug-fixed newer version called JDK1.1.5 is also available, as well as a significantly updated JDK2.0, which is in the Beta testing stage. In addition to JDK, a software development environment, such as, for example, Symanec Visual Café, may also need to be standardized.

It should be appreciated that the MPEG-4 audio-visual object browser systems 200 and 400-1000 are preferably implemented on a programmed general purpose computer. However, the MPEG-4 audio-visual object browser systems 200 and 400-1000 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine can be used to implement the MPEG-4 audio-visual object browser systems 200 and 400-1000.

Accordingly, it should be understood that each of elements of the MPEG-4 audio-visual object browser systems 200 and 400-1000 shown in FIGS. 2-15 can be implemented as portions of a suitably programmed general purpose computer. Alternatively, each of elements of the MPEG-4 audio-visual object browser systems 200 and 400-1000 shown in FIGS. 2-15 can be implemented as physically distinct hardware circuits within an ASIC, or using a FPGA, a PDL, a PLA or a PAL, or using discrete logic elements or discrete circuit elements. The particular form each of the elements of the MPEG-4 audio-visual object browser systems 200 and 400-1000 shown in FIGS. 2-15 will take is a design choice and will be obvious and predicable to those skilled in the art.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of the invention.

What is claimed is:

1. An audio-visual object browser system that inputs MPEG-4 data having a scene description graph and data related to at least one object, comprising:
   an audiovisual object demultiplexer and binary format of scene browser for interacting with a user;
   a binary format of scene (BIFS) description graph interpreter connected to the audiovisual object demultiplexer and binary format of scene browser for interpreting the MPEG-4 data, and
   a media decoder, compositor and renderer that receives the interpreted MPEG-4 data and presents at least one object on the audiovisual object demultiplexer and binary format of scene browser.

2. The audio-visual browser system of claim 1, wherein at least one control signal from at least one user input device is provided to the audiovisual object demultiplexer and binary format of scene browser.

3. The audio-visual browser system of claim 1, wherein the MPEG-4 data having a scene description graph and data related to at least one object comprises MPEG-4 coded content, the MPEG-4 coded content including at least one of audio media visual media.

4. The audio-visual browser system of claim 1, wherein the binary format of scene (BIFS) scene description graph interpreter invokes at least one media decoder based on the scene description graph.

5. The audio-visual browser system of claim 1, wherein the binary format of scene (BIFS) scene description graph interpreter comprises:
   at least one object node; and
   at least one corresponding object programmer interface, each object programmer interface connected to a corresponding one of the at least one object mode.

6. The audio-visual browser system of claim 5, wherein the media decoders, compositor and renderer comprises:
   at least one decoder, each decoder connected to a corresponding one the at least one object programmer interface; and
   a scene compositor connected to the at least one decoder.

7. The audio-visual browser system of claim 6, wherein the scene compositor is connected to the audiovisual object demultiplexer and binary format of scene browser and the audiovisual object demultiplexer and binary format of scene browser is connected to the scene compositor.

8. The audio-visual browser system of claim 1, wherein the binary format of scene (BIFS) scene description graph interpreter comprises:
   a VideoObject2D node or a MovieTexture node connected to the audiovisual object demultiplexer and binary format of scene browser;
   a video object programmer interface connected to the VidioObject2D or MovieTexture node;
   an AudioSource node connected to the audiovisual object demultiplexer and binary format of scene browser;
   an audio object programmer interface connected to the Audio Source node;
   an ImageTexture node connected to the audiovisual object demultiplexer and binary format of scene browser; and
   an image object programmer interface connected to the ImageTexture node.

9. The audio-visual browser system of claim 8, wherein the media decoders, compositor and renderer comprises:
   a video object decoder connected to the video object programmer interface;
   an audio object decoder connected to the audio object programmer interface;
   an image object decoder connected to the image object programmer interface; and
   a scene compositor connected to each of the video object decoder, the audio object decoder, and the image object decoder.

10. The audio-visual browser system of claim 9, wherein the scene compositor is connected to the audiovisual object demultiplexer and binary format of scene browser and the audio visual object demultiplexer and binary format of scene browser is connected to the scene compositor.

11. The audio-visual browser system of claim 8, wherein the binary format of scene (BIFS) scene description graph interpreter further comprises:
   a proto note; and
   a native proto programmer interface connected to the proto node.

12. The audio-visual browser system of claim 11, wherein the media decoders, compositor and renderer comprises:
   a video object decoder connected to the video object programmer interface;
   an audio object decoder connected to the audio object programmer interface;
   an image object decoder connected to the image object programmer interface;
   a native proto implementation connected to the native proto programmer interface; and
   a scene compositor connected to each of the native proto implementation, the video object decoder, the audio object decoder, and the image object decoder.

13. The audio-visual browser system of claim 12, wherein the scene compositor is connected to the audiovisual object demultiplexer and binary format of scene browser and the audiovisual object demultiplexer and binary format of scene browser is connected to the scene compositor.

14. The audio-visual browser system of claim 8, wherein the binary format of scene (BIFS) scene description graph interpreter further comprises:
   a script node;
   an interpreter programmer interface connected to the script node; and
   a scripting interface.

15. The audio-visual browser system of claim 14, wherein the media decoders, compositor and renderer comprises:
   a video object decoder connected to the video object programmer interface;
   an audio object decoder connected to the audio object programmer interface;
   an image object decoder connected to the image object programmer interface;
   a native proto implementation connected to the native proto programmer interface;
   a JavaScript interpreter connected to the interpreter programmer interface;
   a scene compositor connected to each of the native proto implementation, the video object decoder, the audio object decoder, and the image object decoder.

16. The audio-visual browser system of claim 15, wherein the scene compositor is connected to the audiovisual object demultiplexer and binary format of scene browser and the audiovisual object demultiplexer and binary format of scene browser is connected to the scene compositor.

17. The audio-visual browser system of claim 15, wherein the JavaScript interpreter and the Java interpreter are connected to the scripting interface.

18. The audio-visual browser system of claim 17, wherein the multimedia browser supports programmatic behavior and interaction via the JavaScript interpreter and the Java interpreter to modify the scene internally.

19. The audio-visual browser system of claim 14, wherein the scripting interface is connected to the audiovisual object demultiplexer and binary format of scene browser.

20. The audio-visual browser system of claim 1, wherein at least one control signal from at least one user input device is provided to the audiovisual object demultiplexer and binary format of scene browser and to the binary format of scene (BIFS) scene description graph interpreter.

21. The audio-visual browser system of claim 1, further comprising an adaptive audio visual session connected to the audiovisual object demultiplexer and binary format of scene browser.

22. The audio-visual browser system of claim 21, wherein at least one control signal from at least one user input device is provided to the adaptive audio visual session.

23. The audio-visual browser system of claim 21, wherein the adaptive audio visual session comprises:
   and adaptive audio visual session external interface;
   a browser specific binding connected to the adaptive audio visual session external interface; and
   a browser programmer interface connected to the browser specific binding.

24. The audio-visual browser system of claim 23, wherein the audiovisual object demultiplexer and binary format of scene browser is connected to the browser programmer interface.

25. The audio-visual browser system of claim 23, wherein at least one control signal is provided to the adaptive audio visual session external interface.

26. The audio-visual browser system of claim 25, wherein at least one control signal is an adaptive audio visual session external script or applet.

27. The audio-visual browser system of claim 1, wherein the multimedia browser supports programmatic behavior and interaction via at least one of Java and JavaScript to modify the scene internally.

28. The audio-visual browser system of claim 1, wherein the multimedia browser supports external interface for BIFS player control in response to changing resources and support of user interaction.

29. A computer-readable medium having instructions that control a computing device to provide an audio-visual object browser that operates on MPEG-4 data having a scene description graph and data related to at least one object, the instructions comprising:
   providing an audiovisual object demultiplexer and binary format of scene browser for interacting with a user;
   interpreting a binary format of scene (BIFS) description graph associated with the MPEG-4 data from the audiovisual object demultiplexer and binary format of scene browser; and
   decoding, composing and rendering the interpreted BIFS scene description graph on the audiovisual object demultiplexer and binary format of scene browser.

* * * * *

UNITED STATES PATENT AND TRADEMARK OFFICE
CERTIFICATE OF CORRECTION

| | |
|---|---|
| PATENT NO. | : 7,281,200 B2 |
| APPLICATION NO. | : 10/662831 |
| DATED | : October 9, 2007 |
| INVENTOR(S) | : Barin Geoffry Haskell, Atul Puri and Robert Lewis Schmidt |

It is certified that error appears in the above-identified patent and that said Letters Patent is hereby corrected as shown below:

On the Title Page, at Item (63) and at Item (60), Related U.S. Application Data, should read as follows:

Continuation of application No. 09/236,462, filed on Jan. 25, 1999, now Pat. No. 6,654,931.

Provisional application No. 60/072,923, filed on Jan. 28, 1998.

Signed and Sealed this
Twentieth Day of March, 2012

David J. Kappos
*Director of the United States Patent and Trademark Office*